United States Patent [19]

Kamitakahara et al.

[11] Patent Number: 5,368,789
[45] Date of Patent: Nov. 29, 1994

[54] METHOD FOR FORMING SUBSTRATE SHEET FOR OPTICAL RECORDING MEDIUM

[75] Inventors: Hirofumi Kamitakahara, Yokohama; Hitoshi Yoshino, Kawasaki; Osamu Kanome, Yokohama; Tetsuya Sato; Hisanori Hayashi, both of Kawasaki, all of Japan

[73] Assignee: Canon Kabushiki Kaisha, Tokyo, Japan

[21] Appl. No.: 765,972

[22] Filed: Sep. 26, 1991

[30] Foreign Application Priority Data

Sep. 28, 1990 [JP] Japan .................. 2-260233

[51] Int. Cl.⁵ .................. B29C 59/04; B29D 11/00
[52] U.S. Cl. .................. 264/1.33; 264/107; 264/210.2; 264/284; 425/327; 425/363; 425/385
[58] Field of Search .......... 264/106, 107, 1.3, 210.2, 264/284; 156/252, 209; 425/363, 373, DIG. 81, 327, 385

[56] References Cited

U.S. PATENT DOCUMENTS

| 1,466,733 | 9/1923 | Sulzer et al. | |
|---|---|---|---|
| 2,106,245 | 1/1938 | Finch | 101/32 |
| 2,529,083 | 11/1950 | Keefe | |
| 2,834,985 | 5/1958 | Moog | |
| 2,940,125 | 6/1968 | Beucker | |
| 3,072,519 | 1/1963 | Salzman | 156/200 |
| 3,085,292 | 4/1963 | Kindseth | |
| 3,386,130 | 6/1968 | Grunewald et al. | |
| 3,387,330 | 6/1968 | Lemelson | |
| 3,605,194 | 9/1971 | Nauta | |
| 3,751,550 | 8/1973 | Nauta | 264/275 |
| 3,768,946 | 10/1973 | Matuschke | 425/363 |
| 3,839,514 | 10/1974 | Nauta | |
| 3,860,473 | 1/1975 | Wesen | 156/252 |
| 3,874,836 | 4/1975 | Johnson et al. | 425/363 |
| 3,893,795 | 7/1975 | Nauta | 425/403 |
| 4,110,152 | 8/1978 | Dunning et al. | 156/553 |
| 4,211,743 | 7/1980 | Nauta et al. | 264/284 |
| 4,543,225 | 9/1985 | Beaujean | 264/167 |
| 4,746,220 | 5/1988 | Sukai et al. | 366/79 |
| 4,790,893 | 12/1988 | Watkins | 156/232 |
| 4,836,874 | 6/1989 | Foster | 156/209 |
| 4,968,370 | 11/1990 | Watkins | 156/232 |
| 5,048,745 | 9/1991 | Sato et al. | 228/132 |

FOREIGN PATENT DOCUMENTS

| 0369780 | 5/1990 | European Pat. Off. |
| 0369781 | 5/1990 | European Pat. Off. |
| 457604 | 3/1975 | U.S.S.R. |

*Primary Examiner*—Mathieu Vargot
*Attorney, Agent, or Firm*—Fitzpatrick, Cella, Harper & Scinto

[57] ABSTRACT

A method for molding a substrate sheet for an optical recording medium by transferring a preformat pattern from a molding roll to a resin sheet molded by melting and extruding a resin. The molding roll has a roll base, a stamper detachably fixed on the peripheral surface of the roll base, and a resin layer interposed between the roll base and the stamper.

17 Claims, 9 Drawing Sheets

F I G. 10
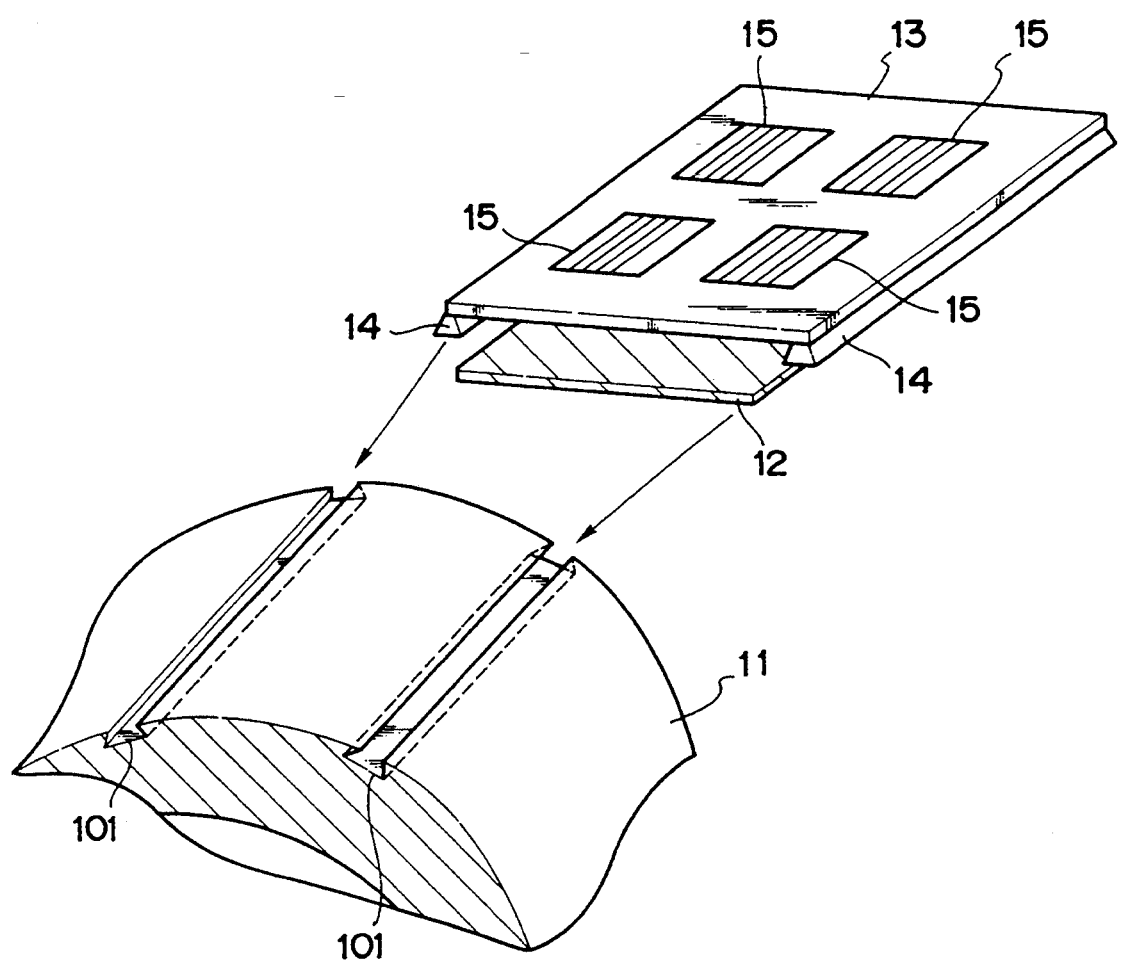

METHOD FOR FORMING SUBSTRATE SHEET FOR OPTICAL RECORDING MEDIUM

BACKGROUND OF THE INVENTION

1. Field of the Invention

The present invention relates to a molding roll for continuously manufacturing substrates for high-density information storage media such as optical discs and optical cards which can record and reproduce information by changing optical characteristics such as reflectance with light of a laser beam or the like.

2. Related Background Art

Heretofore, an optical recording medium has been formed by providing a recording layer on a substrate transparent to light such as a semiconductor laser by which recording and playback of information are carried out, and then laminating a protective layer on the recording layer. On the surface of this substrate for the optical recording medium, there are engraved fine preformats of micron order or submicron order such as grooves for tracking and address information pits. As conventional methods for forming these preformats, for example, an injection molding method and a compression molding method are known. However, these methods are unsatisfactory regarding mass productivity and cost.

In order to solve this problem, the present applicant has suggested, in EP-A-0 369 780 and EP-A-0 369 781, methods for preparing substrate sheets for optical recording media which comprises the steps of melting and extruding a resin to mold resin sheets, and then pressing the molded resin sheets between a molding roll and an oppositely disposed roll to transfer preformats thereto.

According to the above-mentioned methods, substrate sheets for optical recording media can be continuously formed which are excellent in transferability of the performats. In addition, double refraction which will be the cause of the decline in a C/N value is controlled, even when a resin such as polycarbonate which easily causes double refraction is used.

However, as a result of the investigations on the above-mentioned methods, it has been found that values of the double refraction and the transfer accuracy of the substrate sheet change owing to the slight alteration of conditions at the time of the molding, for example, the heating temperature of an extruder, heating temperatures of a molding roll and mirror rolls and room temperature at the time of the molding. The above-mentioned fluctuation of the double refraction and the transfer accuracy is not preferable even if it is in an allowable range, because it interferes with stabilizing the performance of the optical recording media.

The present inventors have investigated the above-mentioned problem in detail, and as a result, have found the following. For example, as described in the above-mentioned EP-A-0 369 780, in the case that the substrate sheet for the optical recording medium is molded by the use of three rolls as shown in FIG. 8 and when the high-quality substrate sheet is desired, a molded resin sheet 82 extruded from a T-die 81 is maintained in a nearly melting state in being pressed between a first roll 83 and a molding roll 84 so as not to cause the double refraction (so as not to fix stress to be applied to the resin) and in order to improve the transferability. In addition, when the molded resin sheet is smoothly transferred from the molding roll 84 to a third roll 85, it is necessary that the molded resin sheet is cooled not to adhere to the molding roll. However, these requirements have been heretofore met by adjusting the molding conditions. Thus, when the high-quality substrate sheet for the optical recording medium is molded, particularly when the temperature of the resin and the molding roll shifts to a lower temperature side, the margin of the molding conditions has been limited.

SUMMARY OF THE INVENTION

The present invention has been achieved in view of the above-mentioned problem, and an object of the present invention is to provide a molding roll which can maintain, at high levels, the transfer accuracy of preformats and the double refraction of a substrate sheet for an optical recording medium, even when molding conditions fluctuate.

Another object of the present invention is to provide an apparatus for producing a substrate for an optical recording medium which can form a substrate sheet for an optical recording medium stably without changing the transfer accuracy of preformats and the double refraction even during fluctuation of molding conditions.

Still another object of the present invention is to provide a method for producing a substrate for an optical recording medium which can give a wide margin of molding conditions, so that a substrate for the optical recording medium having excellent transfer accuracy of preformats and low double refraction is stably produced.

That is, a molding roll of the present invention is a molding roll for molding a substrate sheet for an optical recording medium by transferring a preformat pattern to a resin sheet molded by melting and extruding a resin, said molding roll being characterized by comprising a roll base, a stamper detachably fixed on the peripheral surface of the roll base, and a resin layer interposed between the roll base and the stamper.

Furthermore, a molding roll of the present invention is a molding roll for molding a substrate sheet for an optical recording medium by transferring a preformat pattern to a resin sheet molded by melting and extruding a resin, said molding roll being characterized comprising a roll base, a plurality of stampers detachably fixed on the peripheral surface of the roll base in a peripheral direction of the roll base, and a resin layer interposed between the roll base and the respective stampers and having an intrinsic thickness in accordance with the thickness of the respective stampers.

An apparatus for forming a substrate sheet for an optical recording medium according to the present invention is an apparatus for forming a substrate sheet for an optical recording medium which has a means for melting and extruding a resin to mold a resin sheet, a molding roll for pressing the resin sheet to transfer a preformat pattern to the surface of the resin sheet, and mirror rolls disposed in the face of the molding roll, said apparatus being characterized in that the molding roll comprises a roll base, a stamper detachably fixed on the peripheral surface of the roll base, and a resin layer interposed between the roll base and the stamper.

A method for forming a substrate sheet for an optical recording medium according to the present invention is a method for forming a substrate sheet for an optical recording medium which comprises a step of extruding a melted resin to mold a resin sheet, and a step of pressing the resin sheet by a molding roll and mirror rolls disposed in the face of the molding roll to transfer a preformat pattern to the surface of the resin sheet. The molding roll comprises a roll base, a stamper detachably fixed on the peripheral surface of the roll base, and a resin layer interposed between the roll base and the stamper.

An apparatus for forming a substrate sheet for an optical recording medium according to the present invention is an apparatus for forming a substrate sheet for an optical recording medium which has a means for melting and extruding a resin to mold a resin sheet, a molding roll for pressing the resin sheet to transfer a preformat pattern to the surface of the resin sheet, and mirror rolls disposed in the face of the molding roll. The molding roll comprises a roll base, a plurality of stampers detachably fixed on the peripheral surface of the roll base in a peripheral direction of the roll base, and a resin layer interposed between the roll base and the stamper and having an intrinsic thickness in accordance with the thickness of the respective stampers.

A method for forming a substrate sheet for an optical recording medium according to the present invention is a method for forming a substrate sheet for an optical recording medium which comprises a step of extruding a melted resin to mold a resin sheet, and a step of pressing the resin sheet by a molding roll and mirror rolls disposed in the face of the molding roll to transfer a preformat pattern to the surface of the resin sheet, said method being characterized in that the molding roll is used which comprises a roll base, a plurality of stampers detachably fixed on the peripheral surface of the roll base in a peripheral direction of the roll base, and a resin layer interposed between the roll base and the stamper and having an intrinsic thickness in accordance with the thickness of the respective stampers.

A substrate sheet for an optical recording medium according to the present invention is characterized by being molded by an apparatus for forming a substrate sheet for an optical recording medium which has a means for melting and extruding a resin to mold a resin sheet, a molding roll for pressing the resin sheet to transfer a preformat pattern to the surface of the resin sheet, and mirror rolls disposed in the face of the molding roll, the molding roll comprising a roll base, a stamper detachably fixed on the peripheral surface of the roll base, and a resin layer interposed between the roll base and the stamper.

That is, according to the present invention, the resin layer between the stamper and the roll base functions as a heat insulating layer, whereby the movement of heat from the resin sheet to the molding roll is inhibited at the time of the pressing by the first roll and the molding roll, even when the temperature of the resin fluctuates particularly to a lower temperature side in the molding step. Accordingly, the resin sheet can be maintained at a high temperature level at the pressing point, so that the melt viscosity of the resin can also be inhibited from abruptly dropping, with the result that the follow-up of the molded resin sheet to the stamper and the fixation of internal strain do not occur. Consequently, the high-quality substrate sheet can be obtained.

Incidentally, according to a conventional technique, adhering is carried out for the purpose of simply fixing the stamper on the roll base, and as a result, a resin layer is formed. However, this resin layer is extremely thin, and it is difficult to optionally adjust the thickness of the resin layer and it is also difficult to maintain the uniform thickness. In addition, the stamper is not detachable from the roll base, and thus it is inconveniently difficult to exchange the stamper only. The description of such a conventional molding roll does not refer to the objects, constitutions and effects of the present invention at all.

BRIEF DESCRIPTION OF THE DRAWINGS

FIG. 10 shows a schematic view illustrating the manufacturing process of the molding roll according to the present invention.

DETAILED DESCRIPTION OF THE INVENTION

Next, the present invention will be described in detail in reference to FIGS. 1, 2 and 3.

Figure 1:
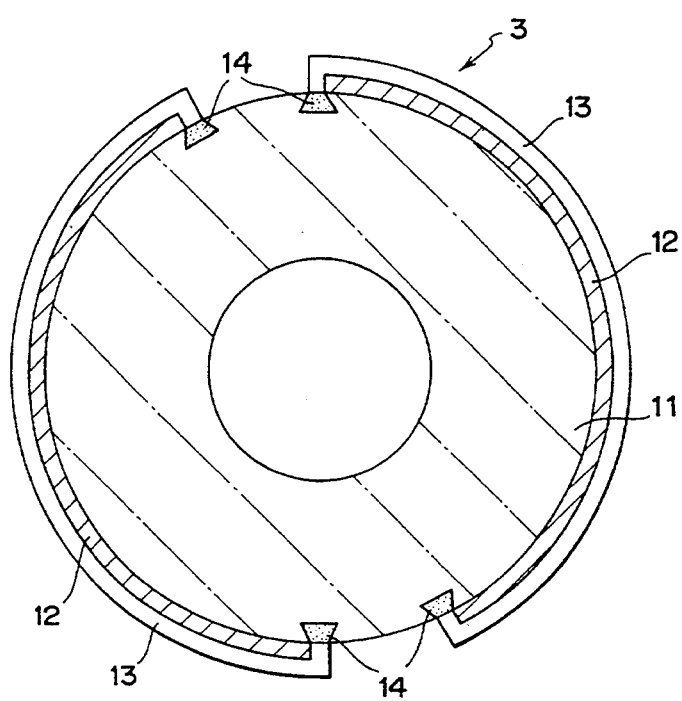
FIG. 1 shows a schematic sectional view illustrating one embodiment of a molding roll of the present invention.
Figure 2:
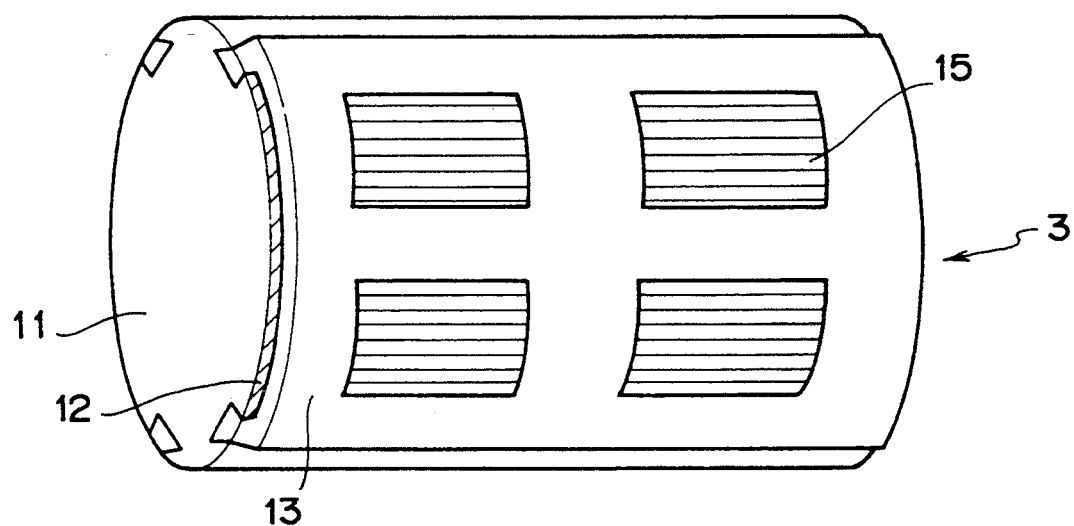
FIG. 2 shows a perspective view illustrating another embodiment of a molding roll of the present invention.

FIGS. 1 and 2 are a schematic sectional view and a perspective view, respectively, illustrating one embodiment of a molding roll for molding a resin substrate of an optical recording medium according to the present invention.

In FIGS. 1 and 2, a molding roll 3 of the present invention comprises a roll base 11 having a peripheral surface which is a mirror surface, a stamper 13 having preformat patterns 15 on the surface thereof and detachably fixed on the roll base 11 by engaging fixtures 14 fixed on the back surface of the stamper with grooves formed so as to engage with the fixtures 14, and a resin layer 12 between the stamper 13 and the roll base 11.

Figure 3:
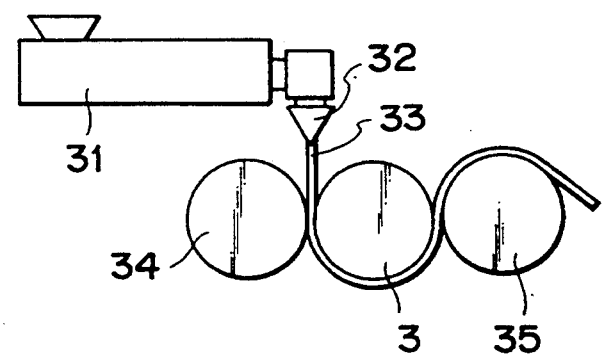
FIG. 3 shows a schematic view of an apparatus for forming a substrate sheet for an optical recording medium according to the present invention.

Furthermore, FIG. 3 shows one embodiment of an apparatus for forming a substrate sheet for an optical recording medium, and reference numeral 31 is an extruder, numeral 32 is a T-die, 33 is a resin sheet melt-extruded from the T-die, and 34 and 35 are the first and second mirror rolls. The resin sheet 33, while being in a melting state, is pressed by the roll 34 and the molding roll 3, so that the preformat patterns are transferred thereto, thereby forming the substrate sheet for the optical recording medium.

The resin layer 12 in the molding roll 3 of the present invention is desirably resistant to a temperature of 200° C. or more, because for example, in the case that polycarbonate is used as a substrate material, temperatures of the molding roll 3 and the mirror rolls 34, 35 are required to be 90° to 150° C., and the temperature of the polycarbonate extruded from the extruder is about 300° C. Here, the above-mentioned resistance to heat is such that the resin layer between the roll base and the stamper does not bring about melting, deformation, decomposition and other mechanical and physical changes at 200° C. for at least 2 hours, preferably 50 hours at the time of molding the substrate sheet.

When a space is formed between the resin layer 12 and the roll base 11 or between the resin layer 12 and the stamper 13, the heat distribution on the surface of the molding roll is not uniform, which causes poor molding of the substrate sheet. Therefore, a roughness on the surface of the resin layer 12 which comes into contact with the roll base 11 and/or the stamper 13 is preferably as small as possible, and in a preferred embodiment, it is 1 μm or less, preferably 0.5 μm or less, and more preferably 0.2 μm or less.

Moreover, in order to prevent the stamper from slipping off on the roll base when the molded resin sheet is pressed, it is preferred that the tensile elongation of the resin is 200% or less, preferably 180% or less, more preferably 150% or less. In addition, it is also preferred that the modulus in tension of the resin is 200 to 1000 kg/mm² (test methods are in accordance with ASTM D-882).

As a material suitable for the resin layer 12, any resin can be used, so long as it meets the above-mentioned conditions. In the case that a polyimide, a fluororesin, a polyether ether ketone (PEEK), a polyether sulfone (PES), a polyparabanic acid resin, a polyphenylene oxide, a polyarylate resin or an epoxy resin is used, the transfer of a preformat pattern to the resin layer can be carried out with extremely high accuracy, the double refraction of the substrate sheet can be decreased, and the influence of the fluctuation of the molding conditions on the substrate sheet can be particularly inhibited. Above all, when the polyimide is used, the above-mentioned effects are large, and thus it is particularly suitable for use in the present invention.

The reason why the above-mentioned resins can be used suitably in the present invention is not definitely known but it can be considered that various physical properties such as thermal conductivity, modulus of elasticity and elongation of each resin function on the whole to provide the excellent effects.

The above-mentioned resins will be described in more detail. An example of the polyimide resin is a resin represented by the formula

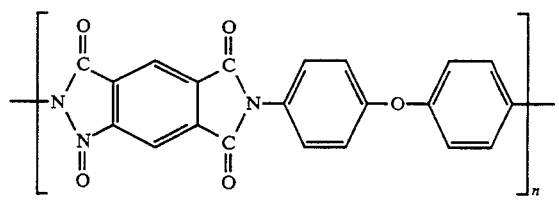

which can be prepared from an aromatic dicarboxylic anhydride such as pyromellitic anhydride and an aromatic diamine such as diaminodiphenyl ether.

Examples of the fluororesin include homopolymers such as polytetrafluoroethylene (PTFE), polymonochlorotrifluoroethylene (PCTFE), polyvinylidene fluoride (PVdF) and polyvinyl fluoride (PVF) as well as copolymers such as tetrafluoroethylene perfluoroalkylvinyl ether copolymer (PFA) and fluorinated ethylene-propylene copolymer (FEP).

PEEK is a polymer represented by the formula

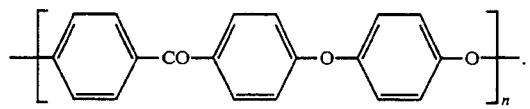

PES is a polymer represented by the formula

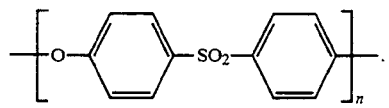

Examples of the epoxy resin are products having a molecular weight of about 5000 or more, preferably 8000 or more which can be obtained from bisphenol A and epichlorohydrin and from an alicyclic compound and derived from polybutadiene.

The polyparabanic acid resin (PPA) is a polymer represented by the formula

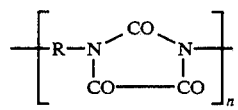

(wherein R is

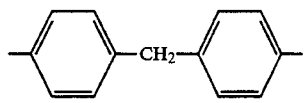

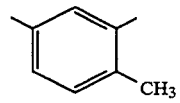

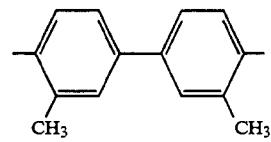

-continued

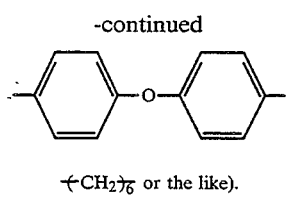

—(CH$_2$)$_6$— or the like).

The polyphenylene sulfide (PPS) is a polymer represented by the formula

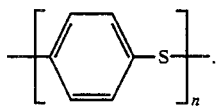

The polyarylate (PA) is an aromatic polyester resin which can be made by the polycondensation reaction of an aromatic dicarboxylic acid with a bisphenol, and when the bisphenol is, for example, bisphenol A, the polyarylate has a structure represented by the formula

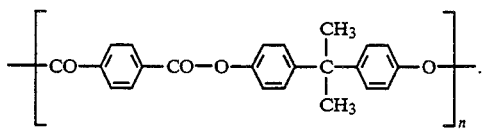

The resin sheet or the formed coating film which is used in the present invention may contain a third component such as a plasticizer, but the content of the third component is preferably 5% or less, more preferably 3% or less.

The above-mentioned materials can be suitably selected from commercially available products. Depending upon the manufacturing method of the molding roll of the present invention which will be hereinafter described, in the case that a polyimide sheet is used as the resin layer, its examples include Kapton (trade mark, made by Du Pont) and Upilex-S and Upilex-R (trade marks, made by Ube Industries, Ltd.). In the case of a fluororesin sheet, for example, there can be used Nitfuron (trade mark, made by Nitto Denko Co., Ltd.) as PTFE, Neoflon CTFE (trade mark, made by Daikin Kogyo Co., Ltd.) as PCTFE, KF Film (trade mark, made by Kureha Chemical Industry Co., Ltd.) or KYNAR (trade mark, made by Mitsubishi Petrochemical Co., Ltd. and Penu Walt Co., Ltd.) as PVdF, Tedlar (trade mark, made by Du Pont) as PVF, Neoflon PFA (trade mark, made by Daikin Kogyo Co., Ltd.) or Teflon PFA (trade mark, made by Mitsui Floro Chemical Co., Ltd.) as PFA, and Neoflon FEP (trade mark, made Daikin Kogyo Co., Ltd.) or Teflon FEP (trade mark, made by Du Pont) as FEP. Additionally, for example, there can be used TALPA-2000 (trade name, made by Mitsui Toatsu Chemicals, Inc.) or Espex (trade name, Sumitomo Chemical Co., Ltd.) as a PEEk sheet, TALPA-1000 (trade name, made by Mitsui Toatsu Chemicals, Inc.) or Sumilite FS-5300 (trade name, made by Sumitomo Bakelite Co., Ltd.) as a PES sheet, SOLDAX (trade name, made by Tonen Petrochemical Co. Ltd.) as a polyparabanic acid resin sheet, Toralyna (trade name, made by Toray Industries, Inc.) as a polyphenylene sulfide sheet, and Enplate (trade name, made by Unitika Ltd.) or Elmec (Kanegafuchi Chemical Industry Co., Ltd.) as a polyarylate sheet.

When the resin layer 12 is formed as a coating film on the back surface of the stamper 13 and/or the peripheral surface of the roll base 11, for example, in the case of the polyimide, a usable example of the polyimide sheet is LARC-TPI (trade name, made by Mitsui Toatsu Chemicals, Inc.).

The thickness of the resin layer 12 is usually 10 to 500 μm, preferably 20 to 220 μm, more preferably 50 to 200 μm. The resin layer having such a thickness functions as a heat insulating layer for a molded resin sheet, does not interfere with feeding heat from the roll base 11 to the stamper 12 so as to keep the temperature of the stamper constant, and prevents the stamper from slipping off on the roll base.

In addition, the heat insulating effect of the molding roll of the present invention depends upon the thickness of the stamper 13, and thus in the case that the metallic stamper is used, it is preferred that the thickness of the resin layer 12 is set so as to be in the above-mentioned range and to be 0.1 time to twice, particularly 0.2 time to once as much as the thickness of the stamper.

Next, the method for forming the molding roll 3 of the present invention will be described with reference to FIGS. 4 to 7.

Figure 4:
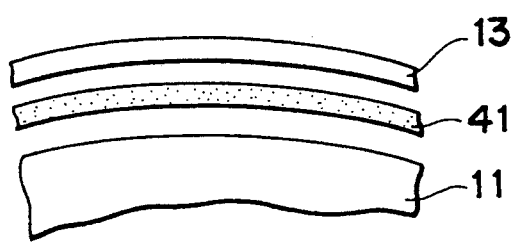
FIG. 4 shows a schematic view illustrating one embodiment of the manufacturing process of the molding roll of the present invention.

FIG. 4 shows the first typical embodiment of the present invention in which a resin sheet 41 is interposed between the roll base 11 and the stamper 13, and the resin sheet is supported between the stamper 12 and the roll base 11 of the molding roll and thus it constitutes the resin layer 12. According to this constitution, the resin sheet can exert the heat insulating effect. Additionally, since the resin sheet takes the form of the sheet, it is easy to dispose the relatively thick resin layer 12 (e.g., 75–200 μm), and the thickness of the resin layer can also be controlled by selecting the thickness of the sheet. In consequence, the heat insulating effect can be easily adjusted only by changing the thickness of the resin sheet. For example, when the material of the molded resin sheet is changed or when the stamper having a different thickness is substituted, the heat insulating effect suitable for the resin material and the stamper can be optimized conveniently by selecting the thickness of the resin sheet.

Figure 5:
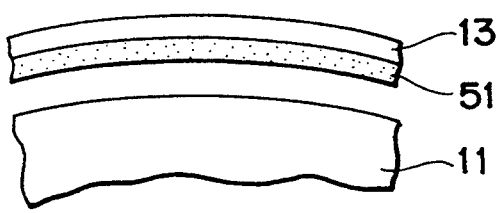
FIG. 5 shows a schematic view illustrating another embodiment of the manufacturing process of the molding roll of the present invention.
Figure 6:
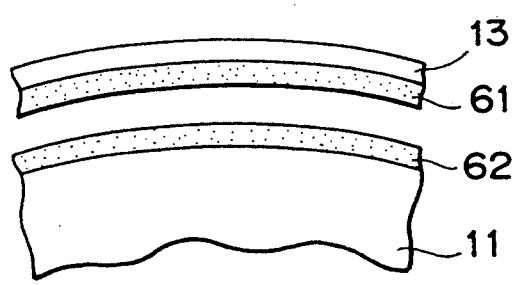
FIG. 6 shows a schematic view illustrating still another embodiment of the manufacturing process of the molding roll according to the present invention.

FIGS. 5 and 6 show the second and third typical embodiments of the molding roll according to the present invention. In the embodiment of FIG. 5, the resin layer 12 is formed as a coating film 51 on the surface (back surface) opposite to the preformat pattern forming surface of the stamper 13, and in the embodiment of FIG. 6, the respective resin layers are formed as coating films 61 and 62 on the surface of the roll base 11 and the back surface of the stamper 13, respectively, and both of the resin layers are intimately joined to form the resin layer 12.

In this case, the resin layer is formed beforehand on the back surface of the stamper or the peripheral surface of the roll base, and therefore the entry of dust and the like can be inhibited when the stamper is engaged with the roll base, so that defectives of the molded sheets decrease to improve the yield thereof. In addition, it is not necessary to take care of the roughness on both the surfaces in contrast to the case of the above-mentioned sheet.

Figure 9:
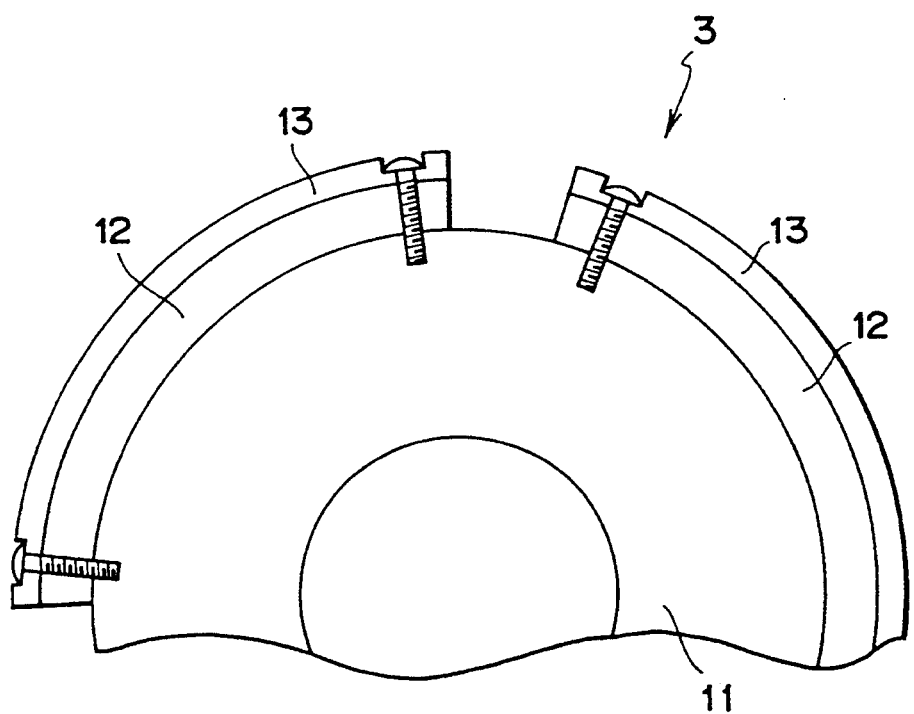
FIG. 9 shows a schematic sectional view illustrating another embodiment of the molding roll according to the present invention.

In this connection, the embodiments of FIGS. 4 to 6 are also very effective in the case that a plurality of stampers are disposed on the peripheral surface of the roll base 11 in its peripheral direction as shown in FIG. 9. This reason is as follows: The stamper 13 is usually prepared so that its thickness may be, for example, 200 μm, but an error of ±25 μm tends to occur in the preparation process. In the case that the plurality of stampers having different thicknesses are disposed in the peripheral direction of the roll base, heat capacity to the resin sheet changes at the respective stamper disposition sites, and a gap between the molding roll and the first roll changes every stamper. Accordingly, pressure which is applied to the resin sheet changes, which makes the transfer accuracy and the double refraction unstable. However, according to the molding roll of the present invention shown in FIGS. 4 to 6, the thickness of the resin layer 12 can be intrinsically set in accordance with that of the stamper 13, and hence the heat capacity can be uniformized and the roundness of the molding roll 3 can be adjusted, which are particularly preferable to stably mass-produce the high-quality substrate sheets for the optical recording media.

Figure 7:
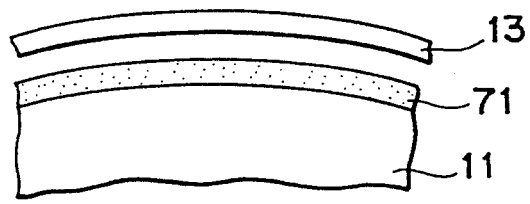
FIG. 7 shows a schematic view illustrating a further embodiment of the manufacturing process of the molding roll according to the present invention.
Figure 8:
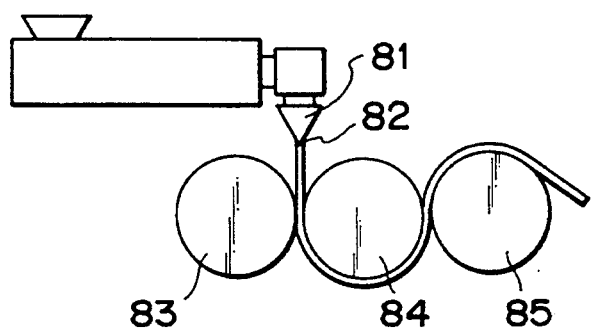
FIG. 8 shows a schematic view illustrating a conventional manufacturing process of the substrate sheet for the optical recording medium.

FIG. 7 shows an embodiment in which the resin layer is formed as a coating film on the surface of the roll base 11. In the embodiment of FIG. 7, the resin layer 71 is formed on the roll surface, and therefore this embodiment facilitates the exchange of the stamper.

In the embodiments of FIGS. 5, 6 and 7, the resin layer is closely in contact with the stamper or the roll surface, and thus the resin layer scarcely slips off at the time of the molding, so that the uniformity of the molded sheet is scarcely impaired.

As a manner of fixing the stamper 13 on the peripheral surface of the mirror roll 11 to constitute the molding roll, there is, for example, a technique in which the fixtures 14 are welded to the opposite edges of the stamper 13 by laser or the like as shown in FIG. 1, and the fixtures are then engaged with and fixed to grooves formed on the roll base 11. Alternatively, the fixation can also be achieved by the use of screws or springs as shown in FIG. 9. Any fixing means can be utilized, so long as the stamper 13, the resin layer 12 and the roll base 11 can be mutually fixed in the intimate joint state.

In the present invention, the roll base 11 preferably has high hardness, good thermal conductivity and easy mirror surface workability of the peripheral surface. For example, steel, chromium steel, aluminum or steel (maraging steel) for molds can be used as the material for the roll base 11. It is preferred that the working accuracy of the peripheral surface of the roll base is substantially equal to or better than the surface accuracy of the substrate for the optical recording medium, and for example, the working accuracy is 1 μm or less, preferably 0.5 μm or less, more preferably 0.2 μm or less.

If necessary, a hard film such as titanium nitride or plating such as chromium plating can be applied onto the surface of the roll base.

The diameter of the roll base 11 is set to about 100–500 mm, particularly about 200–400 mm.

The stamper 13 can usually be made in accordance with a method which is utilized to manufacture compact discs. In the concrete, the stamper can be obtained, for example, by coating a glass matrix with a resist, exposing to light through a pattern, developing, forming a nickel film thereon by sputtering, electroforming to precipitate a nickel layer having a predetermined thickness, and then releasing the resultant stamper from the matrix. The thus obtained stamper may be utilized as the second matrix to form the third stamper.

The stamper preferably is thinner than usually used in injection in order to curve along the roll base 11, and the thickness of the stamper is preferably in the range of about 10 to 300 μm, more preferably 30 to 200 μm.

Examples of the preformat pattern which is formed on the stamper 13 include a spiral pattern, a concentric circle-like pattern and a stripe pattern corresponding to tracking grooves for optical discs and optical cards, each pattern having a width of 1 to 4 μm, a pitch of 1 to 20 μm and a depth of 200 to 5000 Å as well as a pattern corresponding to address pits, the pattern having a width of 0.6 to 10 μm, a length of 0.6 to 20 μm and a depth of 200 to 5000 Å.

Next, a method for manufacturing the substrate sheet for the optical recording medium by the use of the molding roll of the present invention will be described in detail.

That is, in FIG. 3 mentioned above, resin pellets thrown into the extruder 31 are first heated, melted and extruded in a barrel of the extruder 31, pressed by a screw in a molding machine, and then molded into a sheet shape by the T-die 32. The T-die is preferably disposed so that the resin sheet may be extruded between the molding roll 3 and the mirror roll 34, because such a disposition permits transferring the preformat pattern precisely.

Next, the molded resin sheet extruded from the T-die is pressed between the molding roll 3 and the mirror roll 4 to transfer the preformat pattern. At this time, it is preferred that the molded resin sheet 2 is extremely close to a melting state, since the resin can be sufficiently pressed into recesses on the stamper to transfer the fine pattern precisely. Accordingly, the temperature of the T-die preferably is as high as possible, so long as the resin does not decompose, and it is preferably in the range of the glass transition temperature (hereinafter abbreviated to "Tg") of the molded resin+110° C. to Tg+200° C., particularly Tg+130° C. to Tg+190° C. For example, in the case of a polycarbonate resin, the temperature of the T-die is 260° to 340° C., preferably 280° to 330° C., more preferably 290° to 320° C.

If the resin sheet is cooled between the T-die 32 and the molding roll, the preformat pattern is not sufficiently transferred and the double refraction tends to occur. Therefore, the distance between the T-die 32 and the pressing point of the molding roll 3 and the first mirror roll 34 is 20 cm or less, preferably 15 cm or less, more preferably 10 cm or less, and the temperature of an ambient atmosphere therebetween preferably is 60° C. or more.

In order to precisely extrude the resin sheet toward the pressing point, the constitution of vertical extrusion is preferably taken as shown in FIG. 3 in which the pressing point is disposed vertically under the T-die. This reason is that since the resin is nearly in the melting state, the vertical extrusion permits extruding the resin toward the pressing point more accurately than horizontal extrusion.

Surface temperatures of the molding roll 3 and the mirror rolls 4, 5 depend upon the kind of resin to be used, but for example, in the case that polycarbonate is used, the temperature of the molding roll 3 is usually set to 110°–145° C. considering the heat deformation temperature of the polycarbonate, that of the first mirror roll is set to 90°–135° C., and that of the third mirror roll is set to 120°–150° C. In the case that amorphous polyolefin is used, the temperature of the molding roll 3 is set to 120°–145° C., that of the first mirror roll is set to 100°–135° C., and that of the third mirror roll is set to 120°–150° C. According to the present invention, even if the set temperature fluctuates in this range, the transfer accuracy of the preformat pattern and the double refraction do not largely fluctuate, so that the homogeneous and excellent substrate sheet for the optical recording medium can be formed. The temperatures of these rolls can be controlled, for example, by heating them with a heater incorporated in the rolls or by circulating a hot medium to the central portions of these rolls.

In the present invention, when the molding is carried out by using the three rolls as shown in FIG. 3, regulating a ratio of the rotational speed (peripheral speed) of the molding roll 3 to the rotational speed (peripheral speed) of the third mirror roll 35 is effective to decrease the double refraction of the substrate sheet, to improve the transferability of the preformat pattern and to improve the smoothness of the substrate sheet. If the rotational speeds of the molding roll 3 and the mirror roll 35 are represented by $\omega_3$ and $\omega_{35}$, respectively, the above-mentioned speed ratio $\omega_3/\omega_{35}$ is $1.0 < \omega_3/\omega_{35} \leq 1.004$, preferably $1.001 \leq \omega_3/\omega_{35} \leq 1.003$, more preferably $1.001 \leq \omega_3/\omega_{35} \leq 1.0025$.

The substrate sheet for the optical recording medium in which the preformat pattern has been transferred to its surface and the mirror surface has been transferred to its back surface is then cut into sheets, and an optical recording layer and a protective layer are successively formed thereon, thereby obtaining the optical recording medium.

Alternatively, the optical recording layer and the protective layer may be continuously formed on the sheet prior to the cutting.

Next, a resin which can be used as the material for the substrate is preferably a thermoplastic resin having high transmission to light for recording and reproducing. Examples of such a resin include acrylic resins, polyester resins, polycarbonate resins, vinyl resins, polysulfone resins, polyolefin resins and cellulose derivatives.

Incidentally, in the present invention, "detachably" means that in detaching both the members, a separating force is not substantially required on the interface thereof.

As discussed above, according to the molding roll of the present invention, the resin layer, since interposed between the roll base and the stamper, has lower heat conductivity (usually, $1 \times 10^{-3}$ to $1 \times 10^{-4}$ cal/cm·s·°C.) than the heat conductivity (usually, $1 \times 10^{-1}$ to $1 \times 10^{-2}$ cal/cm·s·°C.) of the metallic roll and the metallic stamper, and hence the resin layer functions as a heat insulating layer at the time of the molding to inhibit the temperature of the thermoplastic resin from abruptly dropping, so that the melt viscosity of the resin can also be inhibited from changing and the internal strain of the substrate sheet to be molded can be decreased. In addition, there can be minimized the change of values of the transfer accuracy of the preformat pattern and the double refraction of the substrate sheet which are attributable to the fluctuation of molding conditions such as temperatures of the molding roll and the mirror roll, whereby the margin of the molding conditions can be enlarged.

The present invention will be described in more detail in reference to examples.

EXAMPLE 1

Chromium plating having a thickness of 0.3 mm was deposited on the peripheral surface of an iron roll having a diameter of 300 mm and a width of 400 mm, and the surface of the chromium plating was then mirror-finished to bring surface roughness to 0.1 μm, thereby obtaining a roll base 11. This roll base was then provided with four trapezoidal grooves 101 having an upper bottom of 10.05 mm, a lower bottom of 15.05 mm and a height of 5 mm which would engage with fixtures 14 as shown in FIG. 10.

On the other hand, a stamper was manufactured as follows:

In the first place, a glass matrix having a length of 300 mm and a thickness of 10 mm was coated with a photoresist (trade name AZ-1300; made by Hoechst Japan Co., Ltd.) so that the thickness of the resist might be 300 nm. Next, a preformat pattern corresponding to 2583 track grooves for optical cards was depicted in four sections each having a size of 80 mm × 30 mm on the surface of the resist layer by means of a laser cutting machine, each of the above-mentioned grooves being trapezoidal in its section at an angle (x) of 60° and having a width of 3 μm, a pitch of 12 μm and a depth of 2500 Å. After developing, a nickel film having 100 nm was formed on the resist layer by sputtering. Afterward, a nickel film having a thickness of 200 μm was further deposited thereon by electroforming, and the thus formed nickel film was then released from the resist layer. The back surface of the resist layer on which no preformat pattern was transferred was mirror-polished, so that the thickness of the resist layer was 150 μm and the surface roughness of the back surface was 0.1 μm, thereby forming the stamper 13.

Next, two stainless steel fixtures 14 each having an upper side of 10 mm, a lower side of 15 mm, a height of 5 mm and a length of 300 mm were welded to the back surfaces of opposite edges of the stamper 13 by laser welding to integrally join the fixtures 14 to the stamper 13.

A tetrafluoroethylene polymer sheet having a thickness of 100 μm (trade name Nitfuron; made by Nitto Denko Co., Ltd.; heat resistance temperature 260° C.) was brought into close contact with the back surface of this stamper 13, and the fixtures 14 of the stamper were engaged with the grooves 101 of the roll base 11, whereby the stamper was fixed on the mirror roll, thereby obtaining the molding roll.

In all the same manner as described, another stamper was fixed on the roll base 11, thereby preparing a molding roll shown in FIG. 1.

This molding roll 3 was mounted on a molding machine shown in FIG. 3, and polycarbonate (trade name Panlite L-1225; made by Teijin Chemicals Co., Ltd.) was then extruded from an extruder 31 (trade name SHT 90; Hitachi Shipbuilding & Engineering Co., Ltd.) to mold a substrate sheet for optical cards having a thickness of 0.4 mm and a width of 30 cm.

With regard to molding conditions in this case, the temperature of a T-die 32 was 300° C., the surface temperature of the molding roll was 140° C., the carrying velocity of the molded resin sheet was 3 m/minute, and a ratio between peripheral speeds of the molding roll 3, the mirror roll 35 was set to 1.001, and a molding time was 5 hours.

Figure 11:
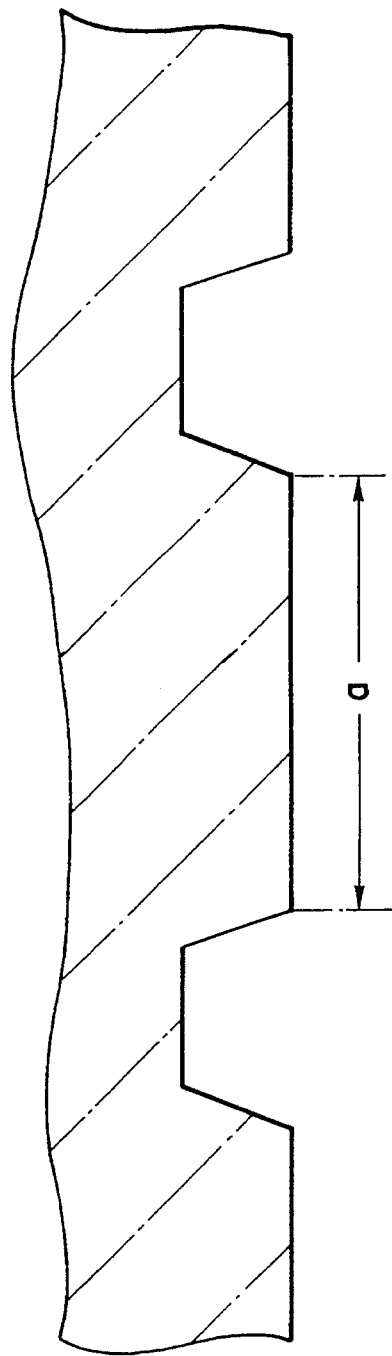
FIG. 11 shows an enlarged sectional view of the preformat pattern portion of the substrate sheet for the optical recording medium according to the present invention.
Figure 12:
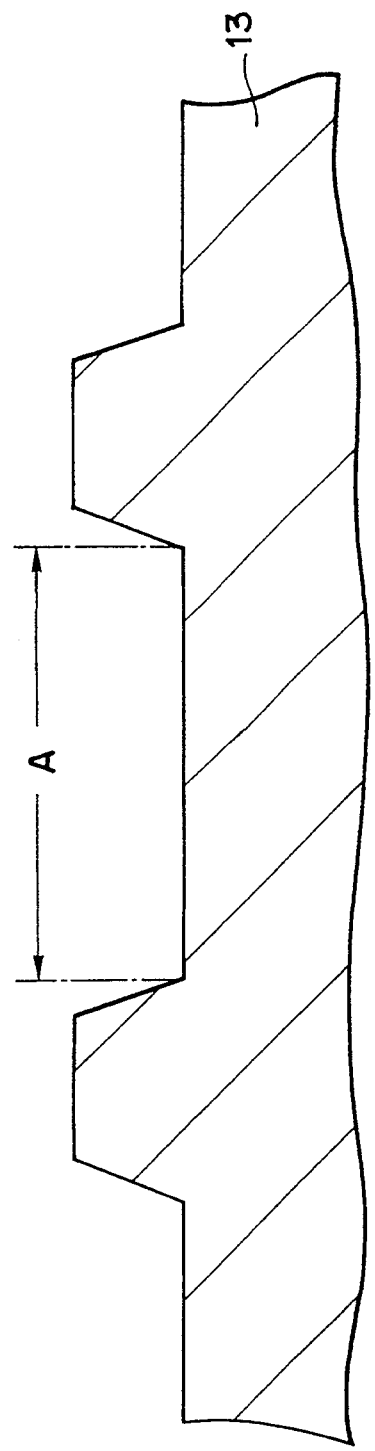
FIG. 12 shows an enlarged sectional view of a stamper on the surface of the molding roll according to the present invention.

For each preformat pattern-transferred portion on the thus obtained substrate sheet, double refraction was measured at 9 positions thereof, and as a result, the average value of the double refraction was 10 mm. Transfer accuracy was evaluated as follows: The section of the preformat pattern-transferred portion in a direction vertical to the 9 track grooves was observed by an electronic surface morphology analyzer (trade name ESA-3000; Erionix Co., Ltd.), and when the width of the land portion of the groove-transferred portion on the substrate sheet was represented by "a" as shown in FIG. 11 and the width of the lower bottom of a groove-forming recess on the stamper was represented by "A" as shown in FIG. 12, the transfer accuracy was evaluated by an average value of a/A. As a result, a/A at each measured position was 0.97, and the obtained substrate sheet for the optical recording medium had the extremely excellent transfer accuracy.

The thickness unevenness of the substrate sheet was 10 μm or less, which was in the range of the standards on the substrate for optical cards.

The double refraction was evaluated from a value of single pass measured with light having a wave length of 830 nm and a spot diameter of 1 μm by the use of a polarimeter (SP-224 type; made by Sinko Seiki Co., Ltd.).

Next, substrate sheets for optical cards were molded under the same conditions as described above except that the surface temperature of the molding roll was changed at an interval of 5° C. in the range of 130° to 150° C. (a case where the molding roll temperature was 140° C. was omitted). For the resultant substrate sheets, the transfer accuracy of a preformat pattern and double refraction were measured and evaluated in the above-mentioned manners. The obtained average values of the transfer accuracy (a/A) and the average values of the double refraction are set forth in Table 1.

Figure 13:
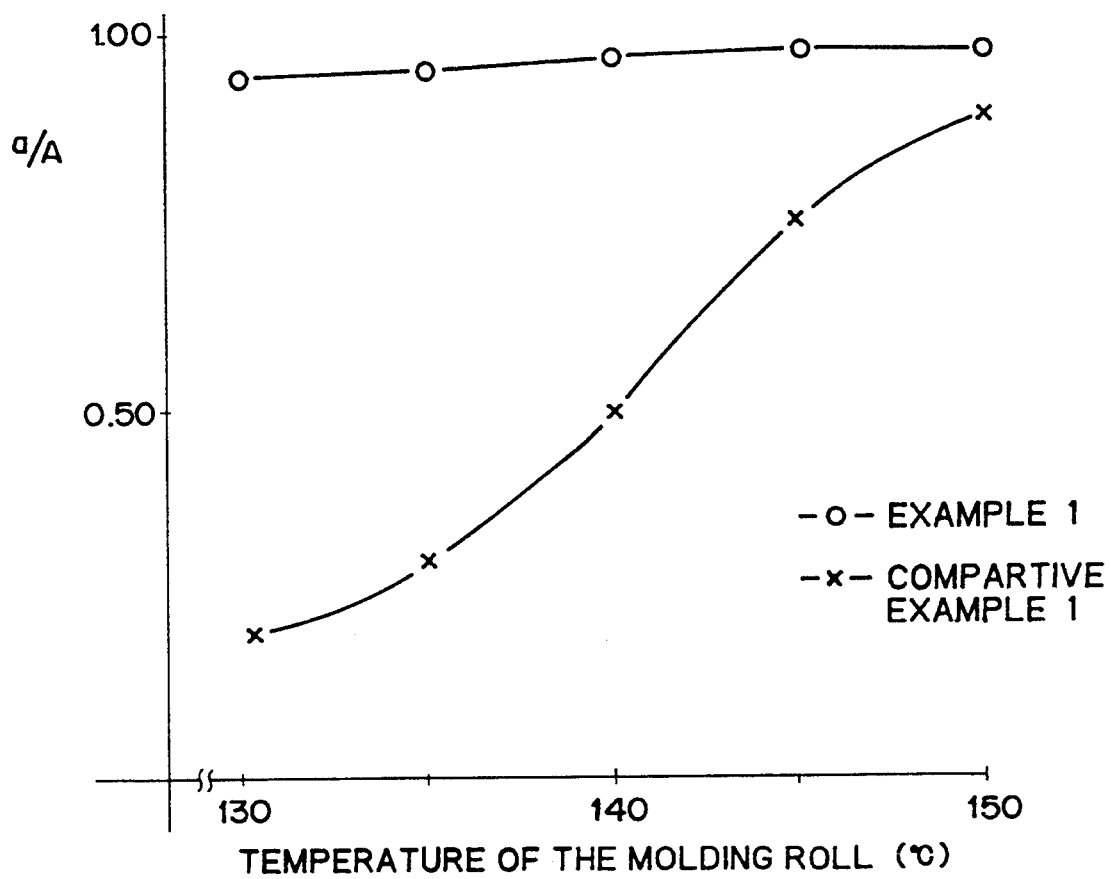
FIG. 13 shows a graph indicating relations between a surface temperature of the molding roll and transfer accuracy.
Figure 14:
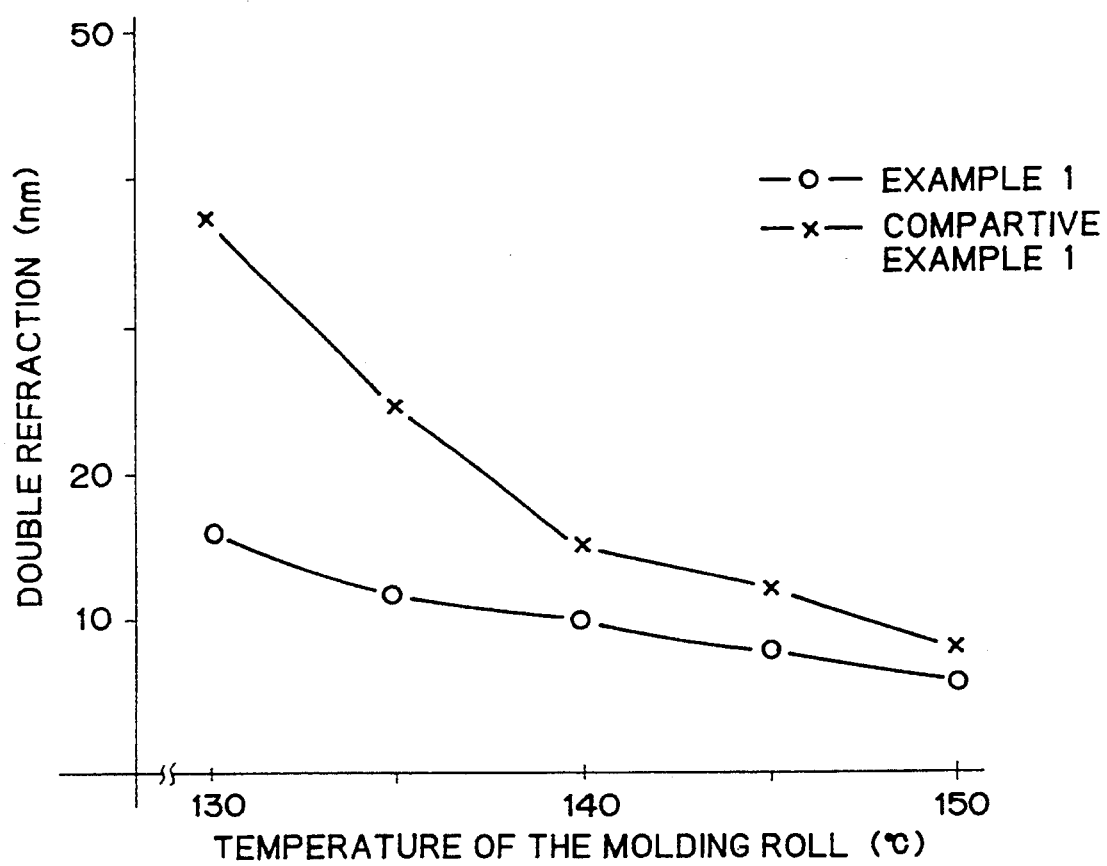
FIG. 14 shows a graph indicating a relation between a surface temperature of the molding roll and the double refraction of the substrate sheet.

Furthermore, plotted curves of these results are shown in FIGS. 13 and 14.

TABLE 1

| Temperature of Molding Roll | Transfer Accuracy (a/A) | Double Refraction |
|---|---|---|
| 130° C. | 0.94 | 18 nm |
| 135° C. | 0.95 | 12 nm |
| 140° C. | 0.97 | 10 nm |
| 145° C. | 0.98 | 8 nm |
| 150° C. | 0.98 | 6 nm |

Comparative Example 1

A molding roll was prepared following the same procedure as in Example 1 except that any resin layer was not interposed between a stamper and a roll base. Furthermore, a substrate sheet was molded by the same procedure as in Example 1 except that the surface temperature of the molding roll was set to 150° C. The resultant substrate sheet was evaluated in the same manner as in Example 1, and as a result, the average value of double refraction was 8 nm, and the average value of transfer accuracy a/A was 0.90.

Next, there were measured values of the transfer accuracy and the double refraction in the case that the temperature of the molding roll was changed at an interval of 5° C. in the range of 130° to 150° C. as in Example 1, and the results are set forth in Table 2. In addition, the respective average values are shown in FIGS. 13 and 14.

TABLE 2

| Temperature of Molding Roll | Transfer Accuracy (a/A) | Double Refraction |
|---|---|---|
| 130° C. | 0.22 | 35 nm |
| 135° C. | 0.30 | 25 nm |
| 140° C. | 0.50 | 15 nm |
| 145° C. | 0.75 | 12 nm |

TABLE 2-continued

| Temperature of Molding Roll | Transfer Accuracy (a/A) | Double Refraction |
|---|---|---|
| 150° C. | 0.90 | 8 nm |

As understood from the results in Example 1 and Comparative Example 1, the molding roll of the present invention can always provide the high-quality substrate sheets for the optical recording media, even if the temperature of the molding roll fluctuates between 130° C. and 150° C., and this means that the margin of the molding conditions could be enlarged.

EXAMPLE 2

A stamper and a roll base were prepared by the same procedure as in Example 1, and a polyimide sheet having a thickness of 75 μm [trade name Upilex-R; made by Ube Industries, Ltd.; heat resistance temperature 400° C., elongation 130%, modulus in tension 380 kg/mm$^2$ (25° C.) was brought into close contact with the stamper. This stamper having the polyimide sheet was then mounted on the roll base, thereby manufacturing a molding roll.

Afterward, a substrate sheet for optical cards was molded in the same manner in Example 1 by the use of the thus obtained molding roll.

In this case, the carrying velocity of the resin sheet was 4 m/minute, and the temperature of the molding roll was changed to 130° C., 140° C. and 150° C. to mold three kinds of substrate sheets.

For the obtained substrate sheets, evaluation was made by the same procedure as in Example 1, and the results are set forth in Table 3.

The thickness unevenness of the substrate sheet was at most 10 μm.

In Example 2 et seq., the double refraction and the transfer accuracy of the substrate sheets were evaluated in accordance with the following ranking.

| Evaluation | Transfer Accuracy | Double Refraction |
|---|---|---|
| AA | 0.95 or more | 10 nm or less |
| A | 0.90 or more and less than 0.95 | more than 10 nm and 15 nm or less |
| B | 0.80 or more and less than 0.90 | more than 15 nm and 20 nm or less |
| C | 0.70 or more and less than 0.80 | more than 20 nm and 30 nm or less |
| D | less than 0.70 | more than 30 nm |

EXAMPLE 3

Chromium plating having a thickness of 0.1 mm was deposited on the peripheral surface of an iron roll having a diameter of 300 mm and a width of 400 mm, and the surface of the chromium plating was then mirror-finished to bring surface roughness to 0.1 μm, thereby obtaining a roll base 11. This roll base was then provided with four rectangular grooves 101 having a length of 15 mm and a width of 5 mm which would engage with fixtures 14 as shown in FIG. 10.

On the other hand, a stamper was formed as follows:

In the first place, a glass matrix having a length of 300 mm and a thickness of 10 mm was coated with a photo-resist (trade name AZ-1300; made by Hoechst Japan Co., Ltd.) so that the thickness of the resist might be 300 nm. Next, a preformat pattern corresponding to 2583 track grooves for optical cards was depicted in four sections each having a size of 80 mm×30 mm on the surface of the resist layer by means of a laser cutting machine, each of the above-mentioned grooves being trapezoidal in its section at an angle (x) of 60° and having a width of 3 μm, a pitch of 12 μm and a depth of 2500 Å. After developing, a nickel film having a thickness of 100 nm was formed on the resist layer by sputtering. Afterward, a nickel film having a thickness of 200 μm was further deposited thereon by electroforming, and the thus formed nickel film was then released from the resist layer. The back surface of the resist layer on which no preformat pattern was transferred was mirror-polished, so that the thickness of the resist layer was 150 μm and the surface roughness of the back surface was 0.1 μm, thereby forming the stamper 13.

Next, two stainless steel fixtures 14 each having a length of 300 mm, a width of 10 mm and a height of 5 mm were welded to the back surfaces of opposite edges of the stamper 13 by laser welding to integrally join the fixtures 14 to the stamper 13.

The back surface of this stamper was uniformly coated with varnish LARC-TPI (Mitsui Toatsu Chemicals, Inc.) by the use of an applicator, and after hot-air drying, the coating film was heated up to 300° C. over 2 hours at a heating rate of 2° C./minute and then maintained at 300° C. for 1 hour, thereby forming a polyimide resin layer having a thickness of 50 μm (heat resistance temperature about 260° C., elongation 8.5%, modulus in tension 360 kg/mm²).

Next, the fixtures 14 of the stamper were engaged with the grooves 101 of the roll base 11, whereby the stamper was fixed on the mirror roll, thereby obtaining the molding roll.

In all the same manner as described, another stamper was fixed on the roll base 11, thereby preparing a molding roll shown in FIG. 1.

A substrate sheet for optical cards was molded in accordance with the same procedure as in Example 1 by the use of this molding roll 3. With regard to molding conditions in this case, the carrying velocity of the resin sheet was 4 m/minute, and the surface temperature of the molding roll was changed to 130° C., 140° C. and 150° C.

For the thus obtained three kinds of substrate sheets, evaluation was made in the same manner as in Example 1, and the results are set forth in Table 3.

The thickness unevenness of the respective substrate sheets was 10 μm or less.

EXAMPLE 4

A tetrafluoroethylene coating film having a thickness of 80 μm was formed on the peripheral surface of the roll base prepared in Example 1.

Next, the polytetrafluoroethylene in the grooves 101 on the roll base was removed therefrom, and the two stampers prepared in Example 1 were fixed on the roll base by engaging fixtures 14 with the grooves 101. Afterward, three kinds of substrate sheets were molded under the same conditions as in Example 1 except that the surface temperature of the molding roll was changed to 130° C., 140° C. and 150° C., followed by evaluation. The results are set forth in Table 3. The thickness unevenness of the respective substrate sheets was 10 μm or less.

EXAMPLE 5

On the back surface of a stamper prepared by the same procedure as in Example 1, a polyimide resin layer having a thickness of 50 μm was formed in the same manner as in Example 3.

On the other hand, the same procedure as in Example 4 was effected to form a polytetrafluoroethylene resin layer having a thickness of 30 μm on the peripheral surface of a roll base prepared in the same manner as in Example 1 (FIG. 7). The above-mentioned stamper was fixed on the roll base to obtain a molding roll, and three kinds of substrate sheets were molded under the same conditions as in Example 1 except that the surface temperature of the molding roll was changed to 130° C., 140° C. and 150° C., followed by evaluation. The results are set forth in Table 3. The thickness unevenness of the respective substrate sheets was at most 10 μm.

TABLE 3

|  | Temperature of Molding Roll | Transfer Accuracy (a/A) | Double Refraction |
|---|---|---|---|
| Example 2 | 130° C. | A | A |
|  | 140° C. | AA | AA |
|  | 150° C. | AA | AA |
| Example 3 | 130° C. | A | A |
|  | 140° C. | A | A |
|  | 150° C. | AA | AA |
| Example 4 | 130° C. | A | B |
|  | 140° C. | AA | A |
|  | 150° C. | AA | AA |
| Example 5 | 130° C. | A | A |
|  | 140° C. | AA | AA |
|  | 150° C. | AA | AA |

EXAMPLE 6

A roll base 11 was prepared in the same manner as in Example 1. Moreover, two stampers were formed in the same manner as Example 1, and in this case, the thickness of one stamper (stamper A) was 150 μm and that of the other stamper (stamper B) was 125 μm. Afterward, a polyimide sheet (trade name Upilex-R; made by Ube Industries, Ltd.) as a resin layer having a thickness of 100 μm was brought into close contact with the back surface of the stamper A and then fixed on the roll base. Furthermore, a polyimide sheet having a thickness of 125 μm was brought into close contact with the back surface of the stamper B and then fixed on the roll base, thereby preparing a molding roll (FIG. 9).

Next, substrate sheets were molded using this molding roll and changing the temperature of the molding roll to 130° C., 140° C. and 150° C. in accordance with the same procedure as in Example 1. For a portion of each substrate sheet on which a preformat pattern was transferred by the stamper A and a portion of the substrate sheet on which a preformat pattern was transferred by the stamper B, transfer accuracy and double refraction were evaluated in the same manner as in Example 1. The results are set forth in Table 4.

The thickness unevenness of the respective substrate sheets was at most 10 μm in both the portions transferred by the stampers A and B.

Comparative Example 2

The same procedure as in Example 6 was effected except that no polyimide sheet was used, to prepare a molding roll, and substrate sheets were then formed by using this molding roll.

In a portion of the substrate sheet on which a preformat pattern was transferred by the stamper A and a portion of the substrate sheet on which a preformat pattern was transferred by the stamper B, transfer accuracy and double refraction were largely different as shown in Table 4, and it was difficult to mold the uniform substrate sheets. In addition, the thickness unevenness of the respective substrate sheets was at most 10 $\mu$m in the preformat pattern portion transferred by the stamper A but it was at most 40 $\mu$m in the preformat pattern portion transferred by the stamper B which was outside of the standards of optical cards.

TABLE 4

| | Temp. of Molding Roll | Stamper | Transfer Accuracy (a/A) | Double Refraction |
|---|---|---|---|---|
| Example 6 | 130° C. | A | A | A |
| | | B | A | A |
| | 140° C. | A | AA | AA |
| | | B | AA | AA |
| | 150° C. | A | AA | AA |
| | | B | AA | AA |
| Comp. Ex. 2 | 130° C. | A | D | D |
| | | B | not transferred | — |
| | 140° C. | A | D | B |
| | | B | not transferred | — |
| | 150° C. | A | A | AA |
| | | B | D | AA |

EXAMPLE 7

A roll base and two stampers were prepared by the same procedure as in Example 1.

Polyether ether ketone sheets (trade name TALPA-2000; made by Mitsui Toatsu Chemicals; elongation 100%, modulus in tension 300 kg/mm$^2$) having a thickness of 100 $\mu$m were brought into close contact with the back surfaces of the two stampers, respectively, and they were then fixed on the roll base.

The resultant molding roll 3 was mounted on a molding machine shown in FIG. 3, and amorphous polyolefin (trade name ZEONEX; made by Nippon Zeon Co., Ltd.) was extruded from an extruder 31 (trade name SHT90; Hitachi Shipbuilding & Engineering Co., Ltd.) to mold a substrate sheet for optical cards having a thickness of 0.4 mm and a width of 30 cm.

With regard to molding conditions, the temperature of a T-die 32 was 300° C., the surface temperature of the molding roll was 140° C., the carrying velocity of the resin sheet was 3 m/minute, a ratio between peripheral speeds of the molding roll 3 and the mirror roll 35 was 1.001, and a molding time was 5 hours.

For each preformat pattern-transferred portion on the thus obtained substrate sheet, double refraction was measured at 9 positions thereof, and as a result, the average value of the double refraction was 10 mm. Transfer accuracy was evaluated as follows: The section of the preformat pattern-transferred portion in a direction vertical to the 9 track grooves was observed by an electronic surface morphology analyzer (trade name ESA-3000; Erionix Co., Ltd.), and when the width of the land portion of the groove-transferred portion on the substrate sheet was represented by "a" as shown in FIG. 11 and the width of the lower bottom of a groove-forming recess on the stamper was represented by "A" as shown in FIG. 12, the transfer accuracy was evaluated by an average value of a/A. The results are set forth in Table 5. Furthermore, for substrate sheets molded at molding roll surface temperatures of 130° C. and 150° C., the evaluation was similarly made.

The thickness unevenness of the respective substrate sheets was 10 $\mu$m or less, which was in the range of the standards on the substrate for optical cards.

The double refraction was evaluated from a value of single pass measured with light having a wave length of 830 nm and a spot diameter of 1 $\mu$m by the use of a polarimeter (SP-224 type; made by Sinko Seiki Co., Ltd.).

The ranking of the evaluation were made in the same manner as in Example 2.

EXAMPLE 8

A substrate sheet for optical cards was molded following the same procedure as in Example 7 except that as a resin layer, a polyphenylene sulfide film having a thickness of 100 $\mu$m (trade name Toralyna 3000, made by Toray Industries, Inc.; elongation 60%, modulus in tension 400 kg/mm$^2$) was substituted for the polyether ether ketone resin layer of Example 7.

EXAMPLE 9

A substrate sheet for optical cards was molded following the same procedure as in Example 7 except that as a resin layer, a polyarylate film having a thickness of 100 $\mu$m (trade name Elmec F-2100; made by Kanegafuchi Chemical Industry Co., Ltd.; elongation 50%) was substituted for the polyether ether ketone resin layer of Example 7.

The values of the transfer accuracy and the double refraction of the thus obtained substrate sheet for optical cards are set forth in Table 5.

EXAMPLE 10

A substrate sheet for optical cards was molded following the same procedure as in Example 7 except that as a resin layer, a polyparabanic acid resin film having a thickness of 125 $\mu$m (trade name SOLDAX, made by Tonen Petrochemical Co. Ltd.) was substituted for the polyether ether ketone resin layer of Example 7.

EXAMPLE 11

A substrate sheet for optical cards was molded following the same procedure as in Example 7 except that as a resin layer, a polyether sulfone film having a thickness of 100 $\mu$m (trade name TALPA-1000; made by Mitsui Toatsu Chemicals, Inc.; elongation 100%, modulus in tension 260 kg/mm$^2$) was substituted for the polyether ether ketone resin layer of Example 7.

The values of the transfer accuracy and the double refraction of the thus obtained substrate sheet for optical cards are set forth in Table 5.

TABLE 5

| | Temperature of Molding Roll | Transfer Accuracy (a/A) | Double Refraction |
|---|---|---|---|
| Example 7 | 130° C. | A | A |
| | 140° C. | AA | AA |
| | 150° C. | AA | AA |
| Example 8 | 130° C. | A | B |
| | 140° C. | AA | A |
| | 150° C. | AA | AA |
| Example 9 | 130° C. | A | B |
| | 140° C. | AA | A |
| | 150° C. | AA | AA |
| Example 10 | 130° C. | A | A |
| | 140° C. | AA | AA |
| | 150° C. | AA | AA |
| Example 11 | 130° C. | A | A |
| | 140° C. | AA | A |

TABLE 5-continued

| Temperature of Molding Roll | Transfer Accuracy (a/A) | Double Refraction |
|---|---|---|
| 150° C. | AA | AA |

Reference Example 1

A molding roll was prepared following the same procedure as in Example 3 except that a polyimide layer having a thickness of 75 μm was formed as a resin layer, and a substrate sheet for optical cards was then molded.

Reference Example 2

A molding roll was prepared following the same procedure as in Example 1 except that a tetrafluoroethylene polymer film having a thickness of 600 μm was used as a resin layer, and a substrate sheet for optical cards was then molded.

The values of the transfer accuracy and the double refraction of the substrate sheets for optical cards in Reference Examples 1 and 2 are set forth in Table 6.

Reference Example 3

A substrate sheet for optical cards was molded following the same procedure as in Example 3 except that in place of the polyimide resin layer in Example 3, silicone RTV rubber (trade name KE 1300; made by The Shin-Etsu Chemical Co., Ltd.; elongation 300%) was applied onto the back surface of a stamper and then cured at room temperature to form a resin layer having a thickness of 50 μm.

The results are set forth in Table 6.

TABLE 6

| | Temperature of Molding Roll | Transfer Accuracy (a/A) | Double Refraction |
|---|---|---|---|
| Reference Example 1 | 130° C. | C | B |
| | 140° C. | B | A |
| | 150° C. | A | AA |
| Reference Example 2 | 130° C. | A | D |
| | 140° C. | A | B |
| | 150° C. | AA | A |
| Reference Example 3 | 130° C. | C | A |
| | 140° C. | B | A |
| | 150° C. | A | AA |

What is claimed is:

1. A method for forming a preformatted substrate sheet for an optical recording medium, said sheet having a double refraction of less than a predetermined double refraction amount and a preformat pattern transferred with at least a predetermined minimum transfer accuracy, said method comprising the steps of:
   providing a molding roll and an opposed roll disposed opposite to said molding roll, said molding roll comprising a roll base having a peripheral surface, a stamper having a preformat pattern that is fixed around the peripheral surface of said roll base and a resin layer interposed between said roll base and said stammer;
   setting the surface temperature of said molding roll to a temperature A;
   extruding a molten resin from a die to form a resin sheet having a temperature B that is higher than said surface temperature A; and
   pressing said resin sheet in a substantially molten state between said molding roll and said opposed roll to transfer said preformat pattern to a surface of said resin sheet such that said resin sheet is brought into direct contact with the surface of said molding roll while said resin sheet has a temperature higher than the surface temperature A of said molding roll, thereby forming a preformatted substrate sheet,
   wherein said resin layer comprises a resin having a lower heat conductivity than that of both said roll base and said stamper, and said resin layer is sufficiently thick to act as an effective heat insulating layer so that it inhibits heat conduction from said resin sheet to said roll base to such an extent that, at said surface temperature A of said molding roll,
   (a) the amount of double refraction in the thus-formed substrate sheet is below said predetermined double refraction amount, and
   (b) the transfer accuracy of said preformat pattern in said substrate sheet is at least as great as said predetermined minimum transfer accuracy,
   whereas if the molding roll had instead (i) had the stamper attached directly to the roll base, without any resin layer being interposed therebetween, and (ii) had a surface temperature A, then the amount of double refraction in the resultant substrate sheet would have been more than said predetermined double refraction amount or the transfer accuracy would have been less than said predetermined minimum transfer accuracy, or both.

2. The method for forming a preformatted substrate sheet for an optical recording medium according to claim 1, wherein the thickness of said resin layer is 10 to 500 μm.

3. The method for forming a preformatted substrate sheet for an optical recording medium according to claim 2, wherein the thickness of said resin layer is 20 to 220 μm.

4. The method for forming a preformatted substrate sheet for an optical recording medium according to claim 3, wherein the thickness of said resin layer is 50 to 200 μm.

5. The method for forming a preformatted substrate sheet for an optical recording medium according to claim 1, wherein said resin layer comprises a resin layer sheet.

6. The method for forming a preformatted substrate sheet for an optical recording medium according to claim 1, wherein said resin layer is formed as a coating film on the surface of said stamper facing said roll base.

7. The method for forming a preformatted substrate sheet for an optical recording medium according to claim 1, wherein the ratio of the thickness of said resin layer to the thickness of said stamper is 0.1 to 2.0.

8. The method for forming a preformatted substrate sheet for an optical recording medium according to claim 7, wherein the ratio of the thickness of said resin layer to the thickness of said stamper is 0.2 to 1.0.

9. A method for forming a preformatted substrate sheet for an optical recording medium, said sheet having a double refraction of less than a predetermined double refraction amount and a preformat pattern transferred with at least a predetermined minimum transfer accuracy, said method comprising the steps of:
   providing a molding roll and an opposed roll disposed opposite to said molding roll, said molding roll comprising a roll base having a peripheral surface, a plurality of stampers having a preformat pattern that is fixed around the peripheral surface of said roll base and a resin layer interposed between said roll base and said plurality of stampers;

setting the surface temperature of said molding roll to a temperature A;

extruding a molten resin from a die to form a resin sheet having a temperature B that is higher than said surface temperature A; and pressing said resin sheet in a substantially molten state between said molding roll and said opposed roll to transfer said preformat pattern to a surface of said resin sheet such that said resin sheet is brought into direct contact with the surface of said molding roll while said resin sheet has a temperature higher than the surface temperature A of said molding roll, thereby forming a preformatted substrate sheet, wherein said resin layer comprises a resin having a lower heat conductivity than that of both said roll base and said stamper, and said resin layer is sufficiently thick to act as an effective heat insulating layer so that it inhibits heat conduction from said resin sheet to said roll base to such an extent that, at said surface temperature A of said molding roll, (a) the amount of double refraction in the thus-formed substrate sheet is below said predetermined double refraction amount, and (b) the transfer accuracy of said preformat pattern in said substrate sheet is at least as great as said predetermined minimum transfer accuracy, whereas if the molding roll had instead (i) had the stamp attached directly to the roll base, without any resin layer being interposed therebetween, and (ii) had a surface temperature A, then the amount of double refraction in the resultant substrate sheet would have been more than said predetermined double refraction amount or the transfer accuracy would have been less than said predetermined minimum transfer accuracy, or both.

10. The method for forming a preformatted substrate sheet for an optical recording medium according to claim 1, wherein said resin extruded from the die comprises a polycarbonate.

11. The method for forming a preformatted substrate sheet for an optical recording medium according to claims 10, wherein said temperature A is within the range of 130° C. to 150° C.

12. The method for forming a preformatted substrate sheet for an optical recording medium according to claim 1, wherein said resin layer contains at least one polymeric material selected from the group consisting of polyimide resins, fluororesins, polyether ether ketones, polyether sulfones, polyparabanic acid resins, polyphenylene oxides, polyarylate resins and epoxy resins.

13. The method for forming a preformatted substrate sheet for an optical recording medium according to claim 12, wherein said resin layer contains a polyimide resin.

14. The method for forming a preformatted substrate sheet for an optical recording medium according to claim 1, wherein said resin layer has a heat conductivity in the range of $1 \times 10^{-3}$ to $1 \times 10^{-4}$ cal/cm·s·° C.

15. The method for forming a preformatted substrate sheet for an optical recording medium according to claim 1, wherein said roll base comprises a metal.

16. The method for forming a preformatted substrate sheet for an optical recording medium according to claim 1, wherein said stamper comprises a metal.

17. A method for forming a preformatted substrate sheet for an optical recording medium, said sheet having a double refraction of less than a predetermined double refraction amount and a preformat pattern transferred with at least a predetermined minimum transfer accuracy, said method comprising the steps of:

providing a molding roll and an opposed roll disposed opposite to said molding roll, said molding roll comprising a roll base having a peripheral surface, a stamper having a preformat pattern that is fixed around the peripheral surface of said roll base and a resin layer interposed between said roll base and said stamper;

setting the surface temperature of said molding roll to a temperature A;

extruding a molten resin from a die to form a resin sheet having a temperature B that is higher than said surface temperature A; and pressing said resin sheet in a substantially molten state between said molding roll and said opposed roll to transfer said preformat pattern to a surface of said resin sheet such that said resin sheet is brought into direct contact with the surface of said molding roll while said resin sheet has a temperature higher than the surface temperature A of said molding roll, thereby forming a preformatted substrate sheet, wherein said resin layer comprises a resin having a lower heat conductivity than that of both said roll base and said stamper, and said resin layer is sufficiently thick to act as an effective heat insulating layer so that it inhibits heat conduction from said resin sheet to said roll base to such an extent that, at said surface temperature A of said molding roll, (a) the amount of double refraction in the thus-formed substrate sheet is below said predetermined double refraction amount, and (b) the transfer accuracy of said preformat pattern in said substrate sheet is at least as great as said predetermined minimum transfer accuracy, whereas if the molding roll had instead (i) had the stamper attached directly to the roll base, without any resin layer being interposed therebetween, and (ii) had a surface temperature A, then the amount of double refraction in the resultant substrate sheet would have been more than said predetermined double refraction amount or the transfer accuracy would have been less than said predetermined minimum transfer accuracy, or both, and wherein said surface temperature A is lower than the minimum temperature at which a molding roll with the stamper attached directly to the roll base, without any resin layer being interposed therebetween, would form a substrate sheet having a double refraction below said predetermined double refraction amount and a preformat pattern transferred in a transfer accuracy at least as great as said predetermined minimum transfer accuracy, and said surface temperature A is higher than a temperature at which said same molding roll having the resin layer, when used to perform the exact same steps, would form a substrate sheet having a double refraction of more than the predetermined double refraction amount or a preformat pattern transferred in a transfer accuracy of lower than said predetermined minimum transfer accuracy, or both.

* * * * *

UNITED STATES PATENT AND TRADEMARK OFFICE
CERTIFICATE OF CORRECTION

PATENT NO. : 5,368,789
DATED : November 29, 1994
INVENTOR(S) : HIROFUMI KAMITAKAHARA, et al.

It is certified that error appears in the above-indentified patent and that said Letters Patent is hereby corrected as shown below: Drawings:

SHEET 8
    FIG. 13, "COMPARTIVE" should read --COMPARATIVE--.

SHEET 9
    FIG. 14, "COMPARTIVE" should read --COMPARATIVE--.

COLUMN 2
    Line 44, "roll being characterized" should read --roll--

COLUMN 5
    Line 61, "known but" should read --known, but--.

COLUMN 6
    Line 7, "N" should read --C--.
$$\underset{O}{\overset{\|}{N}} \quad \underset{O}{\overset{\|}{C}}$$

COLUMN 7
    Line 54, "made" should read --made by--; and
    Line 59, "PEEk" should read --PEEK--.

COLUMN 18
    Line 9, "were" should read --was--.

COLUMN 19
    Line 61, "stammer;" should read --stamper;--.

UNITED STATES PATENT AND TRADEMARK OFFICE
CERTIFICATE OF CORRECTION

PATENT NO. : 5,368,789 Page 2 of 2
DATED : November 29, 1994
INVENTOR(S) : HIROFUMI KAMITAKAHARA, et al.

It is certified that error appears in the above-indentified patent and that said Letters Patent is hereby corrected as shown below:

<u>COLUMN 21</u>
   Line 42, "claims 10," should read --claim 10,--.

Signed and Sealed this

Ninth Day of May, 1995

Attest:

Attesting Officer

BRUCE LEHMAN

Commissioner of Patents and Trademarks